United States Patent [19]

Bjerkoy

[11] Patent Number: 5,113,376
[45] Date of Patent: May 12, 1992

[54] METHOD FOR CONDUCTING SEISMIC SURVEYS IN WATERS COVERED WITH ICE

[75] Inventor: Rolf Bjerkoy, Melsomvik, Norway

[73] Assignee: Geco A.S., Stavanger, Norway

[21] Appl. No.: 657,062

[22] Filed: Feb. 15, 1991

[30] Foreign Application Priority Data

Apr. 9, 1990 [NO] Norway .................. 901616

[51] Int. Cl.$^5$ ............................. G01V 1/38
[52] U.S. Cl. ............................ 367/15; 367/16
[58] Field of Search ............... 367/15, 16; 181/110; 114/253, 254

[56] References Cited

U.S. PATENT DOCUMENTS 3,281,767 10/1966 Cryer ........................... 367/16
3,286,225 11/1966 Huckabay et al. ............. 367/23
4,314,363 2/1982 Thigpen et al. ............... 367/16

Primary Examiner—Ian J. Lobo
Attorney, Agent, or Firm—Fleit, Jacobson, Cohn, Price, Holman & Stern

[57] ABSTRACT

In seismic surveys in waters covered with ice, where seismic impulses are actuated under water and reflected signals are detected by a streamer cable (2) towed behind a vessel (1), in order to avoid the source of noise located outside the seismic system due to the icebreaking operation of the vessel (1) the vessel (1) is stopped during active survey and the streamer cable (3) is hauled in with a speed corresponding to the desired propulsion speed of the cable during detection. After detection the vessel again resumes ordinary operational speed and the streamer is paid out with a speed which maintains the desired advancing speed of the system.

3 Claims, 1 Drawing Sheet

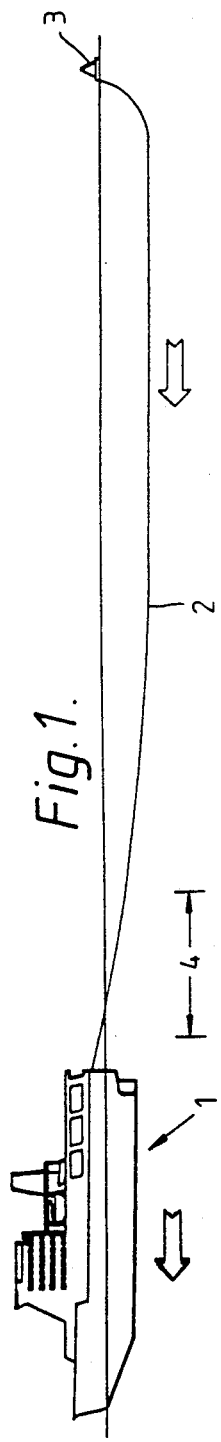
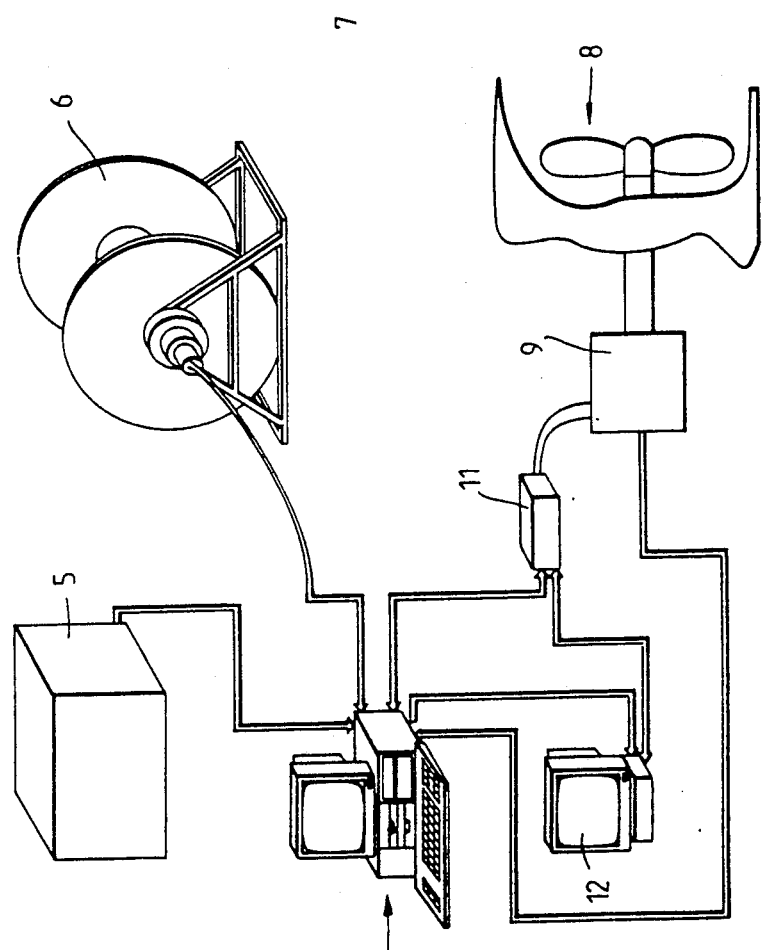

METHOD FOR CONDUCTING SEISMIC SURVEYS IN WATERS COVERED WITH ICE

The invention relates to a method of conducting seismic surveys in waters which are covered with ice, where seismic impulses are emitted under water and reflected signals are recorded by a streamer cable which is towed behind a vessel.

In seismic surveys in waters which are covered with ice a number of problems arise which are not present in common seismic surveys at sea. One of the most significant problems with surveys in such waters which are covered with ice is the noise generated when ice is broken up by the vessel, e.g. an icebreaker, towing the seismic equipment. The data achieved in seismic measurements will be extremely polluted by noise due to the noise occurring when ice is broken up. If the thickness of ice is 60 cm or more, the achieved data will be so greatly interfered with by noise that they cannot be processed at all.

The technique of paying out seismic cables, and hauling them in, respectively, is known per se and reference is made to U.S. Pat. Nos. 4,566,083; 4,314,363; 4,581,723; and 4,570,245 as showing such techniques. In the first two mentioned patents a system and a device are disclosed for excluding noise from the towing vessel in measurements carried out in shallow waters. In shallow waters noise will be generated by buoyancy means and suspending lines of the seismic equipment, since the hydrophones are measuring close to the surface of the water. In order to avoid such noise it is necessary for the streamers to be essentially at rest during measurements. In order to achieve this, so called time windows are provided, and the cable is paid out from the vessel and timed with the propulsion speed in periods, so that the cable will be at rest, whereupon it is hauled in again. According to this technique the cable is paid out and hauled in, but the method of measuring is different from the invention of this application.

According to the last two mentioned patents the cable is also paid out and hauled in, but the object is to maintain a constant tension of the cable in order to compensate for changes of speed due to waves and swell.

None of the two methods discussed above are applicable to areas covered with ice, where propulsion through the ice is in fact the cause of noise.

It is an object of the present invention to provide a method which avoids the above this kind of noise problems due to sources of noise outside the seismic equipment.

This object is achieved by the method characterized by the features of this invention.

In the method of the invention the source of noise is simply eliminated by the fact that icebreaking stops during the measuring period proper. The feature to eliminate the source of noise proper may appear to be obvious, but in seismic surveys at sea one is dependent of a certain advance of the seismic equipment which is moved through the water in order to maintain an exactly defined distance between the seismic sources and between seismic sources and the receiver equipment in the streamer cable, which must be kept extended by the aid of the advance component in towing. Advance of the seismic equipment is maintained by hauling in the cables towards the ship while it is at rest with a speed corresponding to the desired advance speed. This is of great importance to the streamer cable. In waters which are covered with ice it will, in addition, not be natural to stop, because of the hazard of freezing in, and because an icebreaker requires speed to be able to break the ice if it is very thick.

Upon making the seismic measurements the icebreaking vessel will again move forward and break ice in front of it, and the streamers are paid out in sufficient length to permit the vessel to stop again and make a new measurement at the same time as the streamer cable is hauled in. In this manner measurements may be carried out in waters covered with ice without interference of the measurements by noise from icebreaking activity.

BRIEF DESCRIPTION OF THE DRAWINGS

The invention is disclosed in more detail below with reference to an embodiment shown in the drawings, wherein:

FIG. 1 is a diagrammatical view of an icebreaker towing a streamer cable; and

FIG. 2 is a diagrammatical view illustrating an arrangement or system for performing the method according to the invention.

DETAILED DESCRIPTION

In the drawing FIG. 1 shows an icebreaker designated by numeral 1, which is towing a streamer 2 comprising hydrophones, and the end of which is marked by a buoy 3. The sources of seismic energy are also towed behind the vessel in the area marked 4, but are not illustrated in detail here. As regards the design and localization of the sources of seismic energy reference is made to the copending Norwegian Patent Application No. 90 1617.

The icebreaker 1 moves through the ice at maximum speed to break a line. When the time for making a seismic survey approaches, vessel 1 is propulsed at constant speed, e.g. in such a manner that the vessel and the streamer cable 2 move at a speed of, e.g. 2.5 knots. When the vessel reaches the area where the seismic survey is to be carried out, its navigational system, which is designated by numeral 5 in FIG. 2, will emit a start command to a computer 14 according to the invention which operates to slow down the screw at the same time as the sources of seismic energy are fired. While the vessel stops, the computer 14 emits a signal in known manner to hydraulic winch 6 of the streamer cable, to start hauling in streamer cable 2. The streamer cable is maintained at the desired speed, e.g. approximately 2.5 knots. A typical known system and means for controlling the operation of a hydraulic winch and maintaining the desired speed of the streamer cable is described in above referred to U.S. Pat. No. 4,310,363 (e.g. Col. 3, line 39–Col. 4, line 45) and therefore a duplication of such a description is not contained herein. When vessel 1 is completely at rest, the noise level from the icebreaker will stop correspondingly and the recording system of the seismic equipment can, thus, also detect weak signals at the end of the recording sequence.

Upon completion of the recording period, a signal is emitted to the navigational system 5 and to the remaining portion of the system according to the invention. The propulsion system of the vessel receives a command for full speed and screw 8 with its adjusting system 9 is adjusted correspondingly, whereupon icebreaking may start again. With increasing speed winch 6 of the streamer cable will haul more slowly, until the speed of the vessel exceeds the speed of the streamer cable, whereupon the streamer cable is again paid out. In the method according to the invention both the screw and the winch to place the streamer cable in the position it had before recording was initiated are controlled in known manner by computer 14, or a microprocessor, as described in U.S. Pat. No. 4,314,363 (Col. 5, lines 26-33 and FIG. 6)., The system may again be prepared for another recording. The desired interaction between members according to the method of the invention is controlled by computer or microprocessor 14 unit which adjusts a control valve of the hydraulic winch so that desired control is achieved both of the rpm of the winch and its winding direction similarly to U.S. Pat. No. 4,314,363 as mentioned above. The method, furthermore, utilizes electric control valve 11 which controls the pitch of the screw, via adjusting unit 9, between a neutral position and full speed ahead. On the towing vessel, i.e. the icebreaker information on the status of the system may be received, via a display 12, which may provide for manual control of the system in unexpected situations.

The method and device according to the invention proved in tests to be well suitable, permitting good recordings to be achieved in waters which were covered with ice. Many modifications will be possible within the scope of the invention.

I claim:

1. A method for conducting seismic surveys in waters covered with ice, wherein seismic impulses are actuated under water and seismic signals are detected by a streamer cable towed behind a vessel having a screw propulsion system, comprising:
   stopping said vessel to eliminate noise produced by the vessel breaking up ice while carrying out the seismic survey;
   hauling in said streamer cable onto said vessel at a speed corresponding to a predetermined advancing speed for carrying out the detection of the seismic signals;
   operating said vessel to resume normal speed; and
   paying out said streamer cable from said vessel at a speed for maintaining said predetermined advancing speed.

2. The method as claimed in claim 1 and further comprising:
   controlling the speed of the vessel by adjusting the screw propulsion system for stopping, starting and maintaining the speed of said vessel; and
   controlling the speed of said streamer cable during said hauling in and paying out according to said adjustment of said screw propulsion system.

3. The method as claimed in claim 2 and further comprising:
   providing a computer; and
   controlling the speed of said vessel and the speed of said streamer cable by said computer.

* * * * *